United States Patent Office 3,456,060
Patented July 15, 1969

3,456,060
THERAPEUTIC COMPOSITIONS CONTAINING PIPERIDINE DERIVATIVES AND METHODS OF TREATING COUGH AND PAIN THEREWITH
Hans Herbert Kuhnis, Hugo Ryf, and Rolf Denss, Basel, Switzerland, assignors to Geigy Chemical Corporation, Ardsley, N.Y., a corporation of New York
No Drawing. Continuation-in-part of application Ser. No. 562,533, July 5, 1966. This application Aug. 16, 1967, Ser. No. 660,909
Claims priority, application Switzerland, Jan. 15, 1965, 604/65
Int. Cl. A61k 27/00
U.S. Cl. 424—267        24 Claims

ABSTRACT OF THE DISCLOSURE

Therapeutic compositions containing as active ingredients N-substituted 4-allyl- or 4-(methylallyl)-4-acyloxy-piperidines or their pharmaceutically acceptable acid addition salts, which compounds exhibit pronounced activity on the central nervous system, a first subclass of said compounds being particularly useful as antitussives with mild analgesic activity, a second subclass as analgesics of medium strength, and a third subclass as strong analgesics, as well as processes for the preparation of said compositions; methods of treating cough and/or pain by administering these compounds or therapeutic compositions containing them to mammals requiring such treatment. Illustrative embodiments of the active ingredients according to the invention are, e.g., 1-n-octyl-4-allyl-4-propion-oxypiperidine hydrochloride, 1-methyl-4-allyl-4-acetoxy-piperidine hydrochloride, 1,4-diallyl-4-propionoxy-piperidine hydrochloride and 1-(2'-phenylethyl)-4-allyl-4-acetoxy-piperidine hydrochloride.

CROSS REFERENCE TO RELATED APPLICATIONS

This application is a continuation-in-part of our copending patent application Ser. No. 562,533, filed July 5, 1966, now U.S. Patent 3,338,910, issued Aug. 29, 1967, which is a continuation-in-part of our copending patent application Ser. No. 520,093, filed Jan. 12, 1966, now U.S. Patent 3,408,357 issued Oct. 29, 1968, the latter being in turn a continuation-in-part of our copending patent application Ser. No. 382,955, filed July 15, 1964, now U.S. Patent 3,366,638, issued Jan. 30, 1968.

DETAILED DISCLOSURE

This invention relates to methods for therapeutic treatment and to compositions useful for this purpose.

More particularly the invention pertains to methods for the treatment of cough and/or pain in mammals involving the administration to said mammals of an effective amount of a piperidine derivative as hereinafter defined, or a pharmaceutically acceptable acid addition salt thereof, or of a therapeutic composition containing these compounds in combination with a pharmaceutical carrier. It is also an object of the invention to provide therapeutic compositions consisting essentially of (1) a piperidine derivative as hereinafter defined, or a pharmaceutically acceptable acid addition salt thereof, and (2) a pharmaceutical carrier.

In general the structure of the piperidine derivatives which are employed in this invention may be represented as follows:

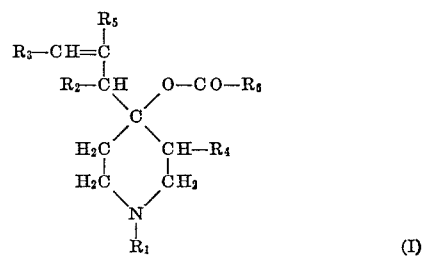

(I)

wherein $R_1$ represents alkyl of at most 8 carbon atoms, alkenyl of from 3 to 8 arbon atoms, cyclohexyl, an unsubstituted phenylalkyl group of at most 9 carbon atoms, or a phenylalkyl group of at most 9 carbon atoms substituted in the phenyl moiety by chloro, bromo, fluoro, lower alkoxy, lower alkyl or 3,4-methylene-dioxy, each of $R_2$, $R_3$, $R_4$ and $R_5$ represents hydrogen or methyl, and $R_6$ represents methyl or ethyl.

In the above formula $R_1$ may be exemplified for alkyl as, e.g., methyl, ethyl, n-propyl, isopropyl, n-butyl, isobutyl, sec. butyl, n-amyl, isoamyl, n-hexyl or n-octyl; for alkenyl as e.g. allyl, crotyl or methallyl; for unsubstituted phenylalkyl as e.g, benzyl, phenylethyl or phenylpropyl; for phenylalkyl substituted in the phenyl moiety as e.g. halogenobenzyl, especially chlorobenzyl, fluorobenzyl and bromobenzyl, as lower alkoxy-benzyl, lower alkylbenzyl and 3,4-methylenedioxy-benzyl, as well as e.g. phenylethyl and phenyl-propyl bearing in the phenyl moiety the substituents named in the foregoing for benzyl.

The term "lower" used in this specification and the appended claims in connection with an aliphatic group means that such group has up to 4 carbon atoms inclusive.

A first preferred embodiment of piperidine derivatives particularly valuable for use in this invention are those compounds of the above formula wherein $R_1$ represents alkyl of between 4 and 8 carbon atoms inclusive or benzyl, each of $R_2$, $R_3$, $R_4$ and $R_5$ represents hydrogen, and $R_6$ represents methyl or ethyl.

Another, second, preferred embodiment of piperidine derivatives particularly valuable for use in this invention are those compounds of the above formula wherein $R_1$ represents alkyl of at most 3 carbon atoms, allyl, phenylethyl or phenylpropyl, $R_2$ respresents hydrogen or methyl, each of $R_3$, $R_4$ and $R_5$ represents hydrogen, and $R_6$ represents (a) ethyl, when $R_1$ is phenylethyl, and $R_2$, $R_3$, $R_4$ and $R_5$ are as defined above, or (b) methyl or ethyl, when $R_1$ is alkyl of at most 3 carbon atoms, allyl or phenylpropyl, and $R_2$, $R_3$, $R_4$ and $R_5$ are as defined above.

Still another, third, preferred embodiment of piperidine derivatives particularly valuable for use in this invention are those compounds of the above formula wherein $R_1$ represents phenylethyl,
each of $R_2$, $R_3$ and $R_5$ represents hydrogen, $R_4$ represents hydrogen or methyl, and $R_6$ represents (a) methyl, when $R_1$, $R_2$, $R_3$, $R_4$ and $R_5$ are as defined above, or
(b) ethyl, when $R_1$, $R_2$, $R_3$ and $R_5$ are as defined above, and $R_4$ is methyl.

Also included within the scope of the present invention are the pharmaceutically acceptable addition salts of the above piperidine derivatives with inorganic or organic acids. By pharmaceutically acceptable addition salts of the bases usable according to the invention are meant salts with those acids the anions of which are pharmacologically acceptable in the usual dosages, i.e. they have no toxic effects. It is also of advantage if the salts to be used crystallise well and are not or are only slightly hygroscopic. Examples of pharmaceutically acceptable salts are the salts with hydrochloric acid, hydrobromic acid, sulfuric acid, phosphoric acid, methane sulfonic acid, ethane sulfonic acid, β-hydroxy-ethane sulfonic acid, acetic acid, lactic acid, oxalic acid, succinic acid, fumaric acid, maleic acid, malic acid, tartaric acid, citric acid, benzoic acid, salicylic acid, phenylacetic acid, mandelic acid and embonic acid.

Piperidine derivatives according to the invention, i.e. those of Formula I, as well as their addition salts with inorganic or organic acids, exhibit, on preferably oral and parenteral administration, valuable pharmacological properties, among which there are, in particular, central nervous depressant as well as antitussive and also analgesic activity with, at the same time, a favorable therapeutic index, while not being liable to cause addiction. Their pharmacological properties, which are illustratively demonstrated further below, render these piperidines and their acid addition salts well suited for reducing tussive irritation and for the treatment of cough and also for the treatment, relief and removal, of pain of various origin, in mammals, and thus for the use as active ingredients in therapeutic compositions according to the invention.

Piperidine derivatives of the first preferred embodiment of the invention are especially pronounced anti-tussives with mild analgesic activity and are thus useful in the treatment of cough and tussive irritation, particularly in the treatment of tussive conditions where mild analgesic action is also desirable.

Piperidine derivatives of the second preferred embodiment of the invention in particular exhibit analgesic action of medium strength while being, at the same time, free from causing respiratory depression, whereas piperidine derivatives of the third preferred embodiment of the invention are distinguished by especially strong analgesic activity. By virtue of these pharmacological properties the piperidines of the second and the third preferred embodiment of the invention are particularly useful for the treatment, relief and removal, of pain of various origin; the compounds of the above third embodiment are thereby preferably administered parenterally.

The pharmacological action of the compounds of the invention may illustratively be demonstrated, for example, by means of the test described by R. Domenjoz, Archiv für experimentelle Pathologie und Pharmakologie, 215, 19–24 (1952), the test described by F. Gross, Helvet. Physiol. Acta, 5, C31 (1947) with the apparatus of H. Friebel, the test based on the procedure described by F. Haffner, Deutsche Medizinische Wochenschrift, 24, 731 (1929), the test following the method of A. D. Woolfe and G. McDonald, J. Pharmacol. Exptl. Therap., 80, 300 (1944) and the screening method for testing the influence on respiration of rabbits with the use of the apparatus described by Ch. Beaufort, Ann. Univ. Saraviensis, Med., VI/3/4, 216–242 (1958).

In the test described by R. Domenjoz healthy cats of normal weight are narcotized with a suitable narcotic. Doses of 30–65 mg./kg. of aprobarbital are applied intraperitoneally to obtain a relatively superficial narcosis. About 45 minutes after the injection of the narcotic, the preparation of the nervus laryngeus superior is started, by fitting on an irritation-electrode. An apparatus manufactured by "Grass Medical Instruments," Type SD5, allowing irritation of the aforesaid nerve with rectangular current-impulses of any desired frequency and intensity is connected to the electrode. The irritation-frequency applied is 5 cycles at an irritation-intensity between 0.5 and 3 volts. The irritation-duration is about 8 seconds and the interval between two irritations is about 120 seconds. For the registrations of the cough reflexes, a Marey capsule is used. A respiration-cannula is introduced through the oral cavity down to the glottic chink. The compound to be tested is injected intravenously in the form of a 1% aqueous solution of its hydrochloride.

Excellent antitussive activity is shown in this test for 1-n-octyl-4-allyl-4-propionoxy-piperidine hydrochloride in doses of about 0.5 to 1.0 mg./kg., and for 1-n-butyl-4-allyl-4-propionoxy-piperidine hydrochloride and 1-benzyl-4-allyl-4-acetoxy-piperidine hydrochloride in doses of about 1.0 to 2.0 mg./kg.

The apparatus of Friebel used in the test described by F. Gross comprises an electrically heated lamp which is placed in the focus of a semi-elliptical metal, concave mirror. Under the mirror, on a turn-table, there are located 10 small Plexiglas cages each holding a white mouse in such a position that the mouse-tail rests stretched out in a small groove on a Plexiglas plate. The turn-table can be turned so that the mouse-tails one after the other come to be placed into the second focus of the elliptical mirror. Pain is induced by the convergent heat radiation from the mirror and the time is measured from the moment when the heat reaches the mouse-tail till the moment at which the mouse twitches its tail.

Two series of 10 mice each are tested prior to the administration of the test compound, and the normal reaction time for each mouse is recorded. Then the test compound is administered either by intraperitoneal injection or orally and the reaction times after the administration are recorded, thus enabling determination of the intensity and the duration of the analgesic effect of the test compound administered.

1-n-octyl-4-allyl-4-propionoxy-piperidine hydrochloride exhibits in this test during 60 minutes an average increase of 50% of the threshold of irritation (prolongation of reaction time) at doses of 48 mg./kg. p.o., while having at the same time a favorable therapeutic index: the toxicity value $LD_{50}$ of this compound in the rat is >700 mg./kg. p.o.

Respective data shown in this test for other representative compounds according to the invention are as follows:

| Compound | Dose producing an average increase of 50% of the threshold of irritation (mg./kg.) | Acute toxicity, $LD_{50}$ (mg./kg.) |
| --- | --- | --- |
| 1-n-butyl-4-allyl-4-propionoxy-piperidine hydrochloride. | 63 p.o. | >450 (rat, p.o.). |
| 1-benzyl-4-allyl-4-acetoxy-piperidine hydrochloride. | >200 p.o. | >960 (rat, p.o.). |
| 1-methyl-4-allyl-4-acetoxy-piperidine succinate. | 70 p.o., 56 i.p. | |
| 1-methyl-4-allyl-4-acetoxy-piperidine hydrochloride. | 100 p.o., 25 i.p. | Do. |

For 1-methyl-4-(1'-methylallyl)-4-propionoxy-piperidine hydrochloride, 1-(2'-phenylethyl)-4-alkyl-4-propionoxy-piperidine hydrochloride and 1,4-diallyl-4-propionoxy-piperidine hydrochloride the above mentioned 50% increase of the threshold of irritation is observed at doses ranging from about 20.0 to about 100.0 mg./kg. p.o. and about 10.0 to about 30.0 mg./kg. i.p., respectively, the $LD_{50}$ for 1-methyl-4-(1'-methylallyl)-4-propionoxy-piperidine hydrochloride thereby being >30 mg./kg. i.v. mouse; the respective 50% increase of the threshold of irritation is further observed at doses of from about 2.0 to about 10.0 mg./kg. i.p. for 1-(2'-phenylethyl)-4-allyl - 4 - acetoxy - piperpidine hydrochloride, and 1-(2'-phenylethyl)-3 - methyl - 4 - allyl - 4-propionoxy-piperidine hydrochloride, respectively.

In the test based on the procedure described by F. Haffner for each dose of test substance 20 mice of both sexes (weight 20–25 g.) are examined to see whether they react to a pressure stimulus. A control pressure of 3 kg. is applied to the base of the mouse tail with forceps. A full pain-reaction is shown by the squealing of the animals, their turning and biting the forceps. Animals which do not completely react to this preliminary test, which seldom happens, are excluded from the test. The animals are then given the test preparations, either as an aqueous solution i.p. or as a suspension with gum arabic p.o. The animals which are treated i.p. are tested for pain caused by pressure at 15 minute intervals during one hour. If, at the end of the first hour, still a certain effect is to be demonstrated, the number of animals which react to the forceps pressure is also determined after 90 and 120 minutes. The animals treated per os are not submitted to the first test, since it can be assumed that insufficient test substance has been absorbed at that time.

The animals which react to the applied pressure by turning, squealing and/or biting are considered as having a full reaction to pain, those which only turn are deemed ½ sensitive. Mice which do not react at all are considered completely analgetic, and those with incomplete pain reaction (only turning movement) ½ analgetic. The results of the analgesia-test are expressed by the maximal number of analgetic (not-reacting) animals during the observation period. If not at least 20% insensitive animals can be ascertained, the preparation can be considered as practically ineffective against this strong pain stimulus.

With doses of 100 mg./kg. p.o. of 1-(2'-phenylethyl)-4-allyl-4-acetoxy-piperidine hydrochoride 40% of insensitive animals are ascertained, and with 75 mg./kg. i.p. of 1-(2'-phenylethyl)-3-methyl-4-allyl - 4 - propionoxy-piperidine hydrochloride 50% of the animals remain insensitive.

In the test following the method of A. D. Woolfe et al. pain is produced in groups each of 20 albino mice (weighing from 14 to 18 grams) by placing the animals in a vessel having a bottom plate heated to 56° C. The reaction time, i.e. the time from the beginning of the exposure of each animal till the observation of a pain reaction, namely licking or shaking of its front paw or jumping, is determined. This reaction time is measured twice pror to the application of the test compound. The test compound is then administered either per os through a stomach tube or i.p. to each test animal and the reaction time is again determined, and at 30, 45, 60, and 120 minutes after such application. The prolongation of reaction time after administration of the test compound is indicated in percent of the reaction time obtained prior to administration. The intensity of analgesic activity is represented by the mean value of the data obtained during the first hour of the application of the test compound.

1-(2'-phenylethyl)-4-allyl - 4 - acetoxy - piperidine hydrochloride showed at a dose of 50 mg./kg. p.o. a prolongation of the reaction time of about 32%, and 1-(2'-phenyletheyl)-3-methyl-4-allyl - 4 - propionoxy-piperidine hydrochloride prolonged the reaction time about 101% at a dose of 50 mg./kg. i.p., the first compound thereby exhibiting an $LD_{50}$ of 240 mg./kg. p.o. in the rat, the second compound an $LD_{50}$ of >590 mg./kg. p.o. in the mouse.

In the screening method for testing the influence on respiration of rabbits with the use of the apparatus described by Ch. Beaufort, respiration frequency and respiration volume are registered. In this test, e.g. 1-methyl-4-allyl - 4 - acetoxy - piperidine hydrochloride exhibited in doses up to 10 mg./kg. i.v. no action on the respiration volume and frequency.

It is well known that N-substituted 4-hydroxy-4-phenylethynyl and 4-acyloxy-4-propynyl-piperidines show pronounced pharmacological activity of a general central nervous depressant type and are reported to have an analgesic activity which is not of the morphine-type; and that a few of them apear also to be useful as antitussives. This activity on the central nervous system appears to be adscribable to the electronic configuration of a C≡C bond in the respective substituents in 4-position at the piperidine nucleus, for it is also known that reduction, e.g., of the phenylethynyl to the cis- and trans-styryl analogs results in loss of the central nervous effects.

It is, therefore, not to be expected that in the case of the compounds according to this aspect of the invention which are allyl analogs of the above mentioned 4-propynyl-substituted piperidines, no such loss, but on the contrary, very pronounced activity on the central nervous system is found.

For their intended uses the piperidine derivatives according to the invention may be administered, preferably, orally or, in the form of aqueous solutions of appropriate pharmaceutically acceptable acid addition salts thereof, also parenterally, but may also be administered e.g. rectally, in amounts depending on the species, age and weight of the subject under treatment as well as on the particular condition to be treated and, of course, the mode of administration; in general, the daily dosages of the piperidine derivatives of the invention, or their pharmaceutically acceptable acid addition salts, vary between about 1.0 mg. and about 800 mg.; more particularly, in the case of strong analgesics according to the invention, about 1.0 mg. to not more than 50.0 mg. are indicated as daily dosage, and in the case of antitussives and medium strength analgesics according to the invention about 100 mg. to about 800 mg. as daily dosage are preferred.

For administration purposes preferably therapeutic compositions are used consisting essentially of a piperidine derivative according to the invention, or a pharmaceutically acceptable addition salt thereof with an inorganic or organic acid, in combination with a pharmaceutical carrier and, if desired, further additives. These compositions are presented for oral or parenteral administration in solid and liquid dosage units, respectively, such as tablets, dragees (sugar coated tablets), capsules, ampoules, and the like; for rectal administration they are presented in form of suppositories, rectal capsules, etc.; each dosage unit preferably contains between about 1.0 mg. to about 200.0 mg. of an inventive piperidine derivative or a pharmaceutically acceptable acid addition salt thereof, as active ingredient.

In suitable dosage units for oral administration such as dragees (sugar coated tablets), tablets or capsules, the amount of active ingredient is preferably 1% to 90%.

To produce tablets or dragee cores, the active substance is combined with, e.g. solid pulverulent carriers such as lactose, saccharose, sorbitol or mannitol; starches such as potato starch, maize starch or amylopectin, also laminaria powder or citrus pulp powder; cellulose derivatives or gelatine, optionally with the addition of lubricants such as magnesium or calcium stearate or polyethylene glycols of suitable molecular weights, to form tablets or dragee cores. The latter are coated, e.g. with concentrated sugar solutions which can also contain, e.g. gum arabic, talcum and/or titanium dioxide, or with a lacquer dissolved in easily volatile organic solvents or mixtures of solvents. Dyestuffs can be added to these coatings, e.g. to distinguish between different dosages of active substance. Other suitable oral dosage units are hard gelatine capsules as well as soft, closed capsules made from gelatine and a softener such as glycerol. The former contain the active substance and the carrier, preferably as a granulate, in admixture with lubricants such as talcum or magnesium stearate and, optionally, appropriate stabilisers. In soft capsules, the active substance is preferably dissolved or suspended in suitable liquid carriers such as liquid polyethylene glycols; stabilisers can also be added.

In addition, for the treatment of coughs in particular, also, for example, lozenges as well as liquid forms for oral administration not made up into single dosages such as cough syrups prepared with the usual auxiliaries, and drops can be considered.

Dosage units for rectal administration are, e.g. suppositories which consist of a combination of a piperidine derivative of Formula I or a suitable salt thereof using as carrier a neutral fatty foundation, or also gelatine rectal capsules which contain a combination of the active substance or a suitable salt thereof with polyethylene glycols (Carbowaxes) of suitable molecular weight as carriers.

Ampoules for parenteral, particularly intramuscular, administration preferably contain as active ingredient a water soluble pharmaceutically acceptable acid addition salt of an inventive compound, the carrier being water. The concentration of the active ingredient is preferably between 0.5% and 5%. If necessary, suitable stabilising agents and/or buffer substances are added to the ampoule solutions.

The following prescriptions further illustrate the production of tablets, dragees, syrups, drops and ampoules:

(a) 250 g. of 1-methyl-4-allyl-4-acetoxy-piperidine hydrochloride are mixed with 175.80 g. of lactose and 169.70 g. of potato starch, the mixture is moistened with an alcoholic solution of 10 g. of stearic acid and granulated through a sieve. After drying, 160 g. of potato starch, 200 g. of talcum, 2.50 g. of magnesium stearate and 32 g. of colloidal silicon dioxide are mixed in and the mixture is pressed into 10,000 tablets each weighing 100 mg. and containing 25 mg. of active substance. The tablets can be grooved if desired for better adaptation of the dosage.

(b) A granulate is produced from 250 g. of 1-methyl-4-allyl-4-acetoxy-piperidine succinate, 175.90 g. of lactose and the alcoholic solution of 10 g. of stearic acid. After drying, the granulate is mixed with 56.60 g. of colloidal silicon dioxide, 165 g. of talcum, 20 g. of potato starch and 2.50 g. of magnesium stearate and the whole is pressed into 10,000 dragee cores. These are then coated with a concentrated syrup made of 522.28 g. of crystalline saccharose, 6 g. of shellack, 10 g. of gum arabic, 215 g. of talcum, 15 g. of colloidal silicon dioxide, 0.22 g. of dyestuff and 1.5 g. of titanium dioxide and dried. The dragees obtained each weigh 145 mg. and contain 25 mg. of active substance.

(c) To produce a cough syrup, 20 g. of 1-n-octyl-4-allyl-4-propionoxy-piperidine hydrochloride, 42 g. of p-hydroxybenzoic acid methyl ester, 18 g. of p-hydroxybenzoic acid propyl ester and 5,000 g. of crystallised sugar and also any flavouring desired are dissolved in distilled water up to 10 litres.

(d) To produce drops for the treatment of coughs, 500 g. of 1-n-butyl-4-allyl-4-propionoxy-piperidine hydrochloride, 10 g. of ascorbic acid, sweetener, e.g. 5 g. of sodium cyclamate, flavouring as desired and 2,500 g. of sorbitol (70%) are dissolved in distilled water up to 10 litres.

(e) 10 g. of active substance, e.g. 1-(2'-phenylethyl)-3 - methyl - 4-allyl-4-propionoxy-piperidine hydrochloride are dissolved in distilled water up to a volume of 1 litre. This solution is used to fill ampoules, each of 1 ml., containing 10 mg. of active substance.

The compounds of the invention may be prepared by known methods as, for example, described in our copending patent application Ser. No. 562,533, filed July 5, 1966.

Representative piperidine derivatives and acid addition salts thereof which may be employed in the instant invention are particularly those which are described and listed in the following non-limitative examples; these examples are also illustrative for the preparation of said compounds.

Percentages in the preceding specification and in these examples are given by weight. The temperatures are given in degrees centigrade; torr means mm. Hg.

Example 1

10.2 g. of magnesium filings in 30 ml. of abs. ether are placed in a 750 ml. four-necked flask and a little allyl bromide is added dropwise while stirring. As soon as the reaction has begun, 100 ml. of abs. ether are added and 50.8 g. of allyl bromide are added dropwise in such a way that the ether remains boiling under reflux and then the whole is stirred for another 10 minutes. 28.2 g. of 1-propyl-4-piperidone in 50 ml. of abs. ether are then added dropwise, the whole is refluxed for 15 minutes, heating is interrupted and 109.2 g. of propionic acid anhydride in 70 ml. of abs. benzene are added dropwise. The yellowish suspension is then refluxed for 6 hours, poured onto ice, made acid with concentrated hydrochloric acid and the ethereal phase is extracted three times with 6 N hydrochloric acid. The combined acid extracts are made alkaline with concentrated ammonia, extracted four times with chloroform, dried, concentrated and distilled. The 1-propyl-4-allyl-4-propionoxy-piperidine boils at 88°/0.04 torr. The hydrochloride is produced therefrom with ethereal hydrochloric acid in abs. ether. It melts at 225–226° (recrystallised from isopropanol/ether).

The following compounds are produced in the same way:

1-propyl-4-allyl-4-acetoxy-piperidine, B.P. 75°/0.03 torr, hydrochloride M.P. 227°;
1-methyl-4-allyl-4-propionoxy-piperidine, B.P. 70–75°/0.06 torr, hydrochloride M.P. 157–158°;
1-methyl-4-allyl-4-acetoxy-piperidine, B.P. 59–65°/0.05 torr, hydrochloride M.P. 167–168°;
1-(2'-phenylethyl)-4-allyl-4-acetoxy-piperidine, B.P. 136–140°/0.02 torr, hydrochloride M.P. 246°;
1-(2'-phenylethyl)-4-allyl-4-propionoxy-piperidine, B.P. 152°/0.05 torr, hydrochloride M.P. 228–230°;
1-(3'-phenylpropyl)-4-allyl-4-acetoxy-piperidine, B.P. 149–154°/0.05 torr, hydrochloride M.P. 182–183°;
1-(3'-phenylpropyl)-4-allyl-4-propionoxy-piperidine, B.P. 155–160°/0.01 torr, hydochloride M.P. 148–149°;
1-ethyl-4-allyl-4-propionoxy-piperidine, B.P. 70–72°/0.01 torr, hydrochloride M.P. 176–177°, citrate M.P. 173–174°;
1-ethyl-4-allyl-4-acetoxy-piperidine, B.P. 70°/0.01 torr, hydrochloride M.P. 183°; citrate M.P. 158°;
1,4-diallyl-4-acetoxy-piperidine, B.P. 65–66°/0.015 torr, hydrochloride M.P. 173–174°;
1,4-diallyl-4-propionoxy-piperidine, B.P. 87–90°/0.05 torr, hydrochloride M.P. 205–207°;
1-benzyl-4-allyl-4-acetoxy-piperidine, hydrochloride, M.P. 197–198°;
1-n-butyl-4-allyl-4-acetoxy-piperidine, hydrochloride, M.P. 238°;
1-n-butyl-4-allyl-4-propionoxy-piperidine, hydrochloride, M.P. 222°;
1-cyclohexyl-4-allyl-4-acetoxy-piperidine, hydrochloride, M.P. 250°;
1-cyclohexyl-4-allyl-4-propionoxy-piperidine, hydrochloride, M.P. 234°;
1-n-octyl-4-allyl-4-acetoxy-piperidine, hydrochloride, M.P. 221–222°;
1-n-octyl-4-allyl-4-propionoxy-piperidine, hydrochloride, M.P. 196–197°;
1-isopropyl-4-allyl-4-acetoxy-piperidine, hydrochloride, M.P. 220°;
1-isopropyl-4-allyl-4-propionoxy-piperidine, hydrochloride, M.P. 198–199°;
1-(2'-phenyl-ethyl)-3-methyl-4-allyl-4-acetoxy-piperidine, maleate, M.P. 130–131°;

1-(2′-phenyl-ethyl)-3-methyl-4-allyl-4-propionoxy-piperidine, maleate, M.P. 117–118°, and
1-methyl-4-(2′-butenyl)-4-acetoxy-piperidine, citrate, M.P. 192–193°;
1-(p-methoxybenzyl)-4-allyl-4-acetoxy-piperidine, hydrochloride;
1-(p-methoxybenzyl)-4-allyl-4-propionoxy-piperidine, hydrochloride;
1-(3,4-dimethoxybenzyl)-4-allyl-4-acetoxy-piperidine, hydrochloride;
1-(3,4-dimethoxybenzyl)-4-allyl-4-propionoxy-piperidine, hydrochloride;
1-(3,4,5-trimethoxybenzyl)-4-allyl-4-acetoxy-piperidine, hydrochloride;
1-(3,4,5-trimethoxybenzyl)-4-allyl-4-propionoxy-piperidine, hydrochloride;
1-(p-methylbenzyl)-4-allyl-4-acetoxy-piperidine, hydrochloride;
1-(p-methylbenzyl)-4-allyl-4-propionoxy-piperidine, hydrochloride;
1-(m-methylbenzyl)-4-allyl-4-acetoxy-piperidine, hydrochloride;
1-(m-methylbenzyl)-4-allyl-4-propionoxy-piperidine, hydrochloride;
1-(o-methylbenzyl)-4-allyl-4-acetoxy-piperidine, hydrochloride;
1-(o-methylbenzyl)-4-allyl-4-propionoxy-piperidine, hydrochloride;
1-(2,3-dimethylbenzyl)-4-allyl-4-acetoxy-piperidine, hydrochloride;
1-(2,3-dimethylbenzyl)-4-allyl-4-propionoxy-piperidine, hydrochloride;
1-(3,4-dimethylbenzyl)-4-allyl-4-acetoxy-piperidine, hydrochloride;
1-(3,4-dimethylbenzyl)-4-allyl-4-propionoxy-piperidine, hydrochloride;
1-(2,6-dimethylbenzyl)-4-allyl-4-acetoxy-piperidine, hydrochloride;
1-(2,6-dimethylbenzyl)-4-allyl-4-propionoxy-piperidine, hydrochloride;
1-(2,4,6-trimethylbenzyl)-4-allyl-4-acetoxy-piperidine, hydrochloride;
1-(2,4,6-trimethylbenzyl)-4-allyl-4-propionoxy-piperidine, hydrochloride;
1-(3,4-methylenedioxybenzyl)-4-allyl-4-acetoxy-piperidine, hydrochloride;
1-(3,4-methylenedioxybenzyl)-4-allyl-4-propionoxy-piperidine, hydrochloride;
1-(p-chlorobenzyl)-4-allyl-4-acetoxy-piperidine, hydrochloride;
1-(p-chlorobenzyl)-4-allyl-4-propionoxy-piperidine, hydrochloride;
1-(2,4-dichlorobenzyl)-4-allyl-4-acetoxy-piperidine, hydrochloride;
1-(2,4-dichlorobenzyl)-4-allyl-4-propionoxy-piperidine, hydrochloride;
1-(2,6-dichlorobenzyl)-4-allyl-4-acetoxy-piperidine, hydrochloride;
1-(2,6-dichlorobenzyl)-4-allyl-4-propionoxy-piperidine, hydrochloride;
1-(p-fluorobenzyl)-4-allyl-4-acetoxy-piperidine, hydrochloride;
1-(p-fluorobenzyl)-4-allyl-4-propionoxy-piperidine, hydrochloride;
1-(2,6-dichloro-3-methylbenzyl)-4-allyl-4-acetoxy-piperidine, hydrochloride;
1-(2,6-dichloro-3-methylbenzyl)-4-allyl-4-propionoxy-piperidine, hydrochloride;
1-(p-bromobenzyl)-4-allyl-4-acetoxy-piperidine, hydrochloride;
1-(p-bromobenzyl)-4-allyl-4-propionoxy-piperidine, hydrochloride;
1-(p-methoxyphenethyl)-4-allyl-4-acetoxy-piperidine, hydrochloride;
1-(p-methoxyphenethyl)-4-allyl-4-propionoxy-piperidine, hydrochloride;
1-(3,4-dimethoxyphenethyl)-4-allyl-4-propionoxy-piperidine, hydrochloride;
1-(3,4,5-trimethoxyphenethyl)-4-allyl-4-propionoxy-piperidine, hydrochloride;
1-(p-methylphenethyl)-4-allyl-4-acetoxy-piperidine, hydrochloride;
1-(p-methylphenethyl)-4-allyl-4-propionoxy-piperidine, hydrochloride;
1-(o-methylphenethyl)-4-allyl-4-propionoxy-piperidine, hydrochloride;
1-(3,4-methylenedioxyphenethyl)-4-allyl-4-propionoxy-piperidine, hydrochloride;
1-(p-chlorophenethyl)-4-allyl-4-acetoxy-piperidine, hydrochloride;
1-(p-chlorophenethyl)-4-allyl-4-propionoxy-piperidine, hydrochloride;
1-(2,4-dichlorophenethyl)-4-allyl-4-propionoxy-piperidine, hydrochloride;
1-(p-fluorophenethyl)-4-allyl-4-propionoxy-piperidine, hydrochloride;
1-(p-bromophenethyl)-4-allyl-4-propionoxy-piperidine, hydrochloride;
1-[3-(p-methoxyphenyl)-propyl]-4-allyl-4-acetoxy-piperidine, hydrochloride;
1-[3-(p-methoxyphenyl)-propyl]-4-allyl-4-propionoxy-piperidine, hydrochloride;
1-[3-(3,4-dimethoxyphenyl)-propyl]-4-allyl-4-propionoxy-piperidine, hydrochloride;
1-[3-(3,4,5-trimethoxyphenyl)-propyl]-4-allyl-4-propionoxy-piperidine, hydrochloride;
1-[3-(p-tolyl)-propyl]-4-allyl-4-acetoxy-piperidine, hydrochloride;
1-[3-(p-tolyl)-propyl]-4-allyl-4-propionoxy-piperidine, hydrochloride;
1-[3-(o-tolyl)-propyl]-4-allyl-4-propionoxy-piperidine, hydrochloride;
1-[3-(3,4-methylenedioxy-phenyl)-propyl]-4-allyl-4-propionoxy-piperidine, hydrochloride;
1-[3-(p-chlorophenyl)-propyl]-4-allyl-4-acetoxy-piperidine, hydrochloride;
1-[3-(p-chlorophenyl)-propyl]-4-allyl-4-propionoxy-piperidine, hydrochloride;
1-[3-(3,4-dichlorophenyl)-propyl]-4-allyl-4-propionoxy-piperidine, hydrochloride;
1-[3-(p-fluorophenyl)-propyl]-4-allyl-4-propionoxy-piperidine, hydrochloride;
1-[3-(p-bromophenyl)-propyl]-4-allyl-4-propionoxy-piperidine, hydrochloride.

Example 2

14.58 g. of magnesium filings in 25 ml. of abs. ether are placed in a 1500 ml. four-necked flask and a little crotyl bromide (1-bromo-2-butene) is added dropwise. When the reaction has started, 215 ml. of abs. ether are added and the remainder of 27 g. of crotyl bromide is slowly added over 4–5 hours while stirring. The reaction mixture is then stirred for another 30 minutes, 11.3 g. of 1-methyl-4-piperidone in 100 ml. of abs. ether are added in 10 minutes, the mixture is refluxed for 30 minutes, 50 ml. of acetanhydride are added and the yellow suspension is refluxed for another two hours. The mixture is then poured onto ice, acidified with concentrated hydrochloric acid, and the ethereal phase is extracted three times with 6 N hydrochloric acid. The combined acid extracts are made alkaline with concentrated ammonia, extracted four times with chloroform, the chloroform solution is dried and concentrated and the residue is distilled. The 1-methyl-4-(1′-methylallyl)-4-acetoxy-piperidine boils at 59–65°/0.05 torr.

The hydrochloride is produced by adding ethereal hydrochloric acid to the solution of the base in abs. ether. It melts at 198° (recrystallised from acetone).

1-methyl-4-(1′-methylallyl)-4-propionoxy-piperidine is produced in the same way. Its hydrochloride melts at 207° (recrystallised from acetone/isopropanol).

Example 3

(a) 5.1 g. of magnesium filings in 15 ml. of ether are placed in a 350 ml. flask and a little allyl bromide is added dropwise. When the reaction has started, 60 ml. of abs. ether are added and the remainder of 25.4 g. of allyl bromide are so added while stirring that the ether remains boiling under reflux. The whole is then stirred for another 10 minutes whereupon 11.3 g. of 1-methyl-4-piperidone in 30 ml. of abs. ether are slowly added. After refluxing for 30 minutes, ice is added to the mixture which is then acidified with concentrated hydrochloric acid and the ethereal phase is extracted three times with 6 N hydrochloric acid. The combined acid extracts are made alkaline with concentrated ammonia and extracted with chloroform, the chloroform solution is dried and concentrated and the residue is distilled. The 1-methyl-4-allyl-4-piperidinol boils at 60–64°/0.01 torr; the citrate melts at 95–97° (recrystallised from methanol/ether). 1-propyl-4-allyl-4-piperidinol, B.P. 69–76°/0.02 torr, is obtained in the same way.

(b) 7.6 g. of the product of (a) are refluxed for 3 hours with 40 ml. of acetanhydride. The reaction solution is then evaporated in a rotary evaporator, ice is added to the residue which is then made strongly alkaline and extracted five times with chloroform. The chloroform solution is dried and concentrated and the residue is distilled. The 1-methyl-4-allyl-4-acetoxy-piperidine boils at 112–115°/12 torr; the hydrochloride melts at 167–168° (recrystallised from isopropanol/ether).

1-methyl-4-allyl-4-propionoxy-piperidine is produced in the same way. The hydrochloride melts at 157–158° (recrystallised from isopropanol/ether).

Example 4

3.5 g. of 1-methyl-4-allyl-4-piperidinol hydrochloride and 250 mg. of p-toulene sulphonic acid are dissolved in 150 ml. of chloroform. Ketene freshly prepared from acetone is passed through this solution (Quedbeck apparatus, Angew. Chemie 68, 369 (1956)). The progress of the reaction is followed by thin layer chromatography (silica gel with 0.5% sodium hydroxide solution, eluant: methanol). No more starting material can be determined after 15 minutes. The solution turns yellow during the reaction and the temperature rises about 40°. The solution is concentrated to half its volume and extracted twice with 100 ml. of 2 N hydrochloric acid each time. The acid solution is made alkaline with sodium carbonate, the product which precipitates is extracted three times with 100 ml. of ether each time, dried with anhydrous sodium sulphate and concentrated. The oily 1-methyl-4-allyl-4-acetoxy-piperidine is converted into the citrate. M.P. of citrate 181°.

Example 5

2 g. of 1-methyl-4-(2'-propinyl)-4-acetoxy-piperidine are hydrogenated at room temperature under normal pressure with 500 mg. of palladium-$CaCO_3$-lead acetate catalyst and 200 mg. of quinoline. After the calculated amount of hydrogen has been taken up (about 23 minutes), the catalyst is filtered off, the filtrate is evaporated and the residue is distilled. The hydrochloride of 1-methyl-4-allyl-4-acetoxy-piperidine produced from the distillate melts at 167–168° and is identical with the product produced analogously to Example 1.

Example 6

5.64 g. of magnesium in 15 ml. of abs. ether are placed in a Grignard apparatus and 31.3 g. of methallyl bromide are added by first entering 2–3 ml. thereof, and, as soon as the reaction has started, 60 ml. of ether and then the remainder of the methallyl bromide, the latter being added dropwise within 30 minutes. The whole is then refluxed 10 minutes and the N-methyl piperidone is added to 40 ml. of ether. After the reaction has subsided, the solution is refluxed for 30 minutes. 50 ml. of propionic acid anhydride in 50 ml. of abs. benzene are then added and the whole is refluxed for 6 hours. Ice and concentrated hydrochloric acid are then added, the acid phase is removed and the organic phase is extracted twice with 2 N hydrochloric acid. The aqueous extracts are combined, made alkaline with concentrated ammonia, extracted four times with chloroform, dried, evaporated and distilled. The 1-methyl-4-methallyl-4-propionoxy-piperidine boils under 0.04 torr at 60–65°. The citrate is produced therefrom in the usual way and is recrystallised from methanol when it then melts at 177–178°.

Example 7

5 g. of 1-methyl-4-allyl-4-acetoxy-piperidine hydrochloride are dissolved in 30 ml. of water, the solution is rendered alkaline by adding concentrated sodium hydroxide solution, and is then extracted four times with chloroform. The combined extracts are dried over anhydrous sodium sulfate, and evaporated to dryness in a rotary evaporator; the residue is dissolved in 25 ml. of anhydrous diethyl ether, and methane sulfonic acid is added until the methane sulfonate salt has been precipitated quantitatively. The latter is separated by filtration and is recrystallized three times from acetone, M.P. 140–140.5°.

In a similar manner there are produced from the corresponding hydrochlorides and the desired acid, the following pharmaceutically acceptable salts of compounds produced according to Examples 1 to 6:

1-methyl-4-allyl-4-acetoxy-piperidine citrate, M.P. 180–181°, 1-methyl-4-allyl-4-acetoxy-piperidine succinate, M.P. 102–103°, 1-methyl-4-allyl-4-acetoxy-piperidine maleate.

The succinates, methanesulfonates, citrates and maleates of each of the free bases listed below are obtained by reaction of their hydrochlorides and the corresponding acids in accordance with Example 7, supra.

1-methyl-4-(1'-methylallyl)-4-acetoxy-piperidine,
1-methyl-4-allyl-4-propionoxy-piperidine,
1-(2'-phenylethyl)-4-allyl-4-propionoxy-piperidine,
1-benzyl-4-allyl-4-acetoxy-piperidine,
1-(n-butyl)-4-allyl-4-propionoxy-piperidine,
1-(n-octyl)-4-allyl-4-propionoxy-piperidine,
1-(2'-phenylethyl)-4-allyl-4-acetoxy-piperidine.

From 1 - (2' - phenylethyl) - 3 - methyl - 4 - allyl - 4 - propionoxy-piperidine maleate, the hydrochloride, succinate, methanesulfonate and citrate are obtained according to Example 7, by reaction with hydrochloric acid, succinic acid, methane sulfonic acid and citric acid, respectively.

Analogously, 1 - (2' - phenylethyl) - 3 - methyl - 4 - allyl-4-acetoxy-piperidine maleate is converted into the hydrochloride, succinate, methanesulfonate and citrate.

What is claimed is:

1. A therapeutic composition for the treatment of pain and cough consisting essentially of an effective amount of (1) a compound of the formula

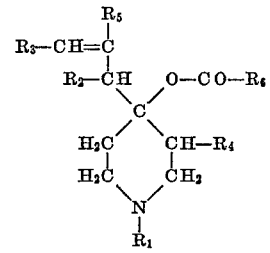

wherein $R_1$ represents alkyl of at most 8 carbon atoms, alkenyl of from 3 to 8 carbon atoms, cyclohexyl, unsubstituted phenylalkyl of at most 9 carbon atoms, or phenylalkyl of at most 9 carbon atoms substituted in the phenyl moiety by chloro, bromo, fluoro, lower alkoxy, lower alkyl or 3,4-methylenedioxy, each of
$R_2$, $R_3$, $R_4$ and $R_5$ represents hydrogen or methyl, and
$R_6$ represents methyl or ethyl, or a pharmaceutically acceptable acid addition salt thereof, and (2) a pharmaceutical carrier.

2. A therapeutic composition for the treatment of pain and cough consisting essentially of an effective amount of
(1) a compound of the formula

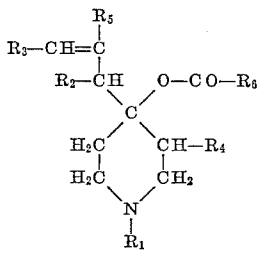

wherein
$R_1$ represents alkyl of between 4 and 8 carbon atoms inclusive or benzyl,
each of
$R_2$, $R_3$, $R_4$ and $R_5$ represents hydrogen, and
$R_6$ represents methyl or ethyl,
or a pharmaceutically acceptable acid addition salt thereof, and (2) a pharmaceutical carrier.

3. A therapeutic composition as defined in claim 2 wherein in said compound $R_1$ represents n-octyl, each of $R_2$, $R_3$, $R_4$ and $R_5$ represents hydrogen, and $R_6$ represents ethyl.

4. A therapeutic composition as defined in claim 2 wherein in said compound $R_1$ represents n-butyl, each of $R_2$, $R_3$, $R_4$ and $R_5$ represents hydrogen, and $R_6$ represents ethyl.

5. A therapeutic composition as defined in claim 2 wherein in said compound $R_1$ represents benzyl, each of $R_2$, $R_3$, $R_4$ and $R_5$ represents hydrogen, and $R_6$ represents methyl.

6. A therapeutic composition for the treatment of pain and cough consisting essentially of an effective amount of
(1) a compound of the formula

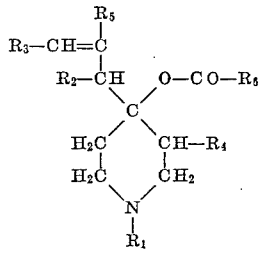

wherein
$R_1$ represents alkyl of at most 3 carbon atoms, allyl, phenylethyl or phenylpropyl,
$R_2$ represents hydrogen or methyl,
each of
$R_3$, $R_4$ and $R_5$ represents hydrogen, and $R_6$ represents
(a) ethyl, when $R_1$ is phenylethyl, and $R_2$, $R_3$, $R_4$ and $R_5$ are as defined above, or (b) methyl or ethyl,
when $R_1$ is alkyl of at most 3 carbon atoms, allyl or phenylpropyl, and $R_2$, $R_3$, $R_4$ and $R_5$ are as defined above,
or a pharmaceutically acceptable acid addition salt thereof, and (2) a pharmaceutical carrier.

7. A therapeutic composition as defined in claim 6 in said compound $R_1$ represents methyl, each of $R_2$, $R_2$, $R_3$, $R_4$ and $R_5$ represents hydrogen, and $R_6$ represents methyl.

8. A therapeutic composition as defined in claim 7 wherein the pharmaceutically acceptable acid addition salt of said compound is the succinate or the hydrochloride.

9. A therapeutic composition as defined in claim 6 wherein in said compound $R_1$ represents methyl, $R_2$ represents methyl, each of $R_3$, $R_4$ and $R_5$ represents hydrogen, and $R_6$ represents ethyl.

10. A therapeutic composition as defined in claim 6 wherein in said compound $R_1$ represents allyl, each of $R_2$, $R_3$, $R_4$ and $R_5$ represents hydrogen, and $R_6$ represents ethyl.

11. A therapeutic composition as defined in claim 6 wherein in said compound $R_1$ represents phenylethyl, each of $R_2$, $R_3$, $R_4$ and $R_5$ represents hydrogen, and $R_6$ represents ethyl.

12. A therapeutic composition for the treatment of pain and cough consisting essentially of an effective amount of
(1) a compound of the formula

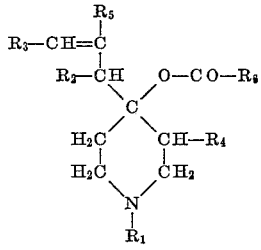

wherein
$R_1$ represents phenylethyl, each or $R_2$, $R_3$ and $R_5$ represents hydrogen,
$R_4$ represents hydrogen or methyl, and
$R_6$ reprsents
(a) methyl, when $R_1$, $R_2$, $R_3$, $R_4$ and $R_5$ are as defined above, or
(b) ethyl, when $R_1$, $R_2$, $R_3$ and $R_5$ are as defined above, and $R_4$ is methyl,
or a pharmaceutically acceptable acid addition salt thereof, and (2) a pharmaceutical carrier.

13. A therapeutic composition as defined in claim 12 wherein in said compound $R_1$ represents phenylethyl, each of $R_2$, $R_3$, $R_4$ and $R_5$ represents hydrogen, and $R_6$ represents methyl.

14. A therapeutic composition as defined in claim 12 wherein in said compound $R_1$ represents phenylethyl, each of $R_2$, $R_3$ and $R_5$ represents hydrogen, $R_4$ represents methyl and $R_6$ represents ethyl.

15. A method of treating pain which comprises administering to a mammal requiring such treatment an analgesically effective amount of a compound of the formula

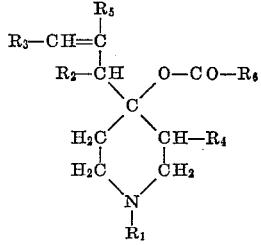

wherein $R_1$ represents alkyl of at most 8 carbon atoms, alkenyl of from 3 to 8 carbon atoms, cyclohexyl, unsubstituted phenylalkyl of at most 9 carbon atoms, or phenylalkyl of at most 9 carbon atoms substituted in the phenyl moiety by chloro, bromo, fluoro, lower alkoxy, lower alkyl or 3,4-methylenedioxy, each of $R_2$, $R_3$, $R_4$ and $R_5$ represents hydrogen or methyl, and $R_6$ represents methyl or ethyl, or a pharmaceutically acceptable acid addition salt thereof.

16. A method of treating pain which comprises administering to a mammal requiring such treatment an analgesically effective amount of a compound of the formula

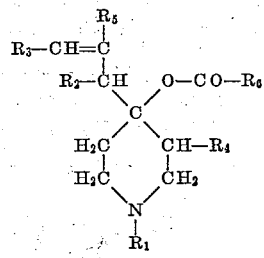

wherein
$R_1$ represents alkyl of at most 3 carbon atoms, allyl, phenylethyl or phenylpropyl,
$R_2$ represents hydrogen or methyl,
each of
$R_3$, $R_4$ and $R_5$ represents hydrogen, and
$R_6$ represents
    (a) ethyl, when $R_1$ is phenylethyl, and $R_2$, $R_3$, $R_4$ $R_5$ are as defined above, or
    (b) methyl or ethyl, when $R_1$ is alkyl of at most 3 carbon atoms, allyl or phenylpropyl, and $R_2$, $R_3$, $R_4$ and $R_5$ are as defined above,
or a pharmaceutically acceptable acid addition salt thereof.

17. A method as defined in claim 16 wherein in said compound $R_1$ represents methyl, each of $R_2$, $R_3$, $R_4$ and $R_5$ represents hydrogen, and $R_6$ represents methyl.

18. A method as defined in claim 17 wherein the pharmaceutically acceptable acid addition salt of said compound is the succinate or the hydrochloride.

19. A method as defined in claim 16 wherein in said compound $R_1$ represents methyl, $R_2$ represents methyl, each of $R_3$, $R_4$ and $R_5$ represents hydrogen, and $R_6$ represents ethyl.

20. A method as defined in claim 16 wherein in said compound $R_1$ represents allyl, each of $R_2$, $R_3$, $R_4$ and $R_5$ represents hydrogen, and $R_6$ represents ethyl.

21. A method as defined in claim 16 wherein in said compound $R_1$ represents phenylethyl, each of $R_2$, $R_3$, $R_4$ and $R_5$ represents hydrogen, and $R_6$ represents ethyl.

22. A method of treating pain which comprises administering to a mammal requiring such treatment an analgesically effective amount of a compound of the formula

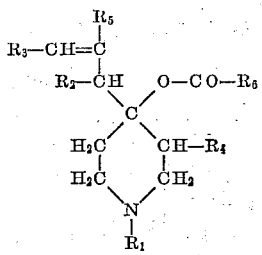

wherein
$R_1$ represents phenylethyl,
each of
$R_2$, $R_3$ and $R_5$ represents hydrogen,
$R_4$ represents hydrogen or methyl, and
$R_6$ represents
    (a) methyl, when $R_1$, $R_2$, $R_3$, $R_4$ and $R_5$ are as defined above, or
    (b) ethyl, when $R_1$, $R_2$, $R_3$ and $R_5$ are as defined above, and $R_4$ is methyl,
or a pharmaceutically acceptable acid addition salt thereof.

23. A method as defined in claim 22 wherein in said compound $R_1$ represents phenylethyl, each of $R_2$, $R_3$, $R_4$ and $R_5$ represents hydrogen, and $R_6$ represents methyl.

24. A method as defined in claim 22 wherein in said compound $R_1$ represents phenylethyl, each of $R_2$, $R_3$ and $R_5$ represents hydrogen, $R_4$ represents methyl, and $R_6$ represents ethyl.

References Cited
UNITED STATES PATENTS

| | | | |
|---|---|---|---|
| 2,798,073 | 7/1957 | Lee et al. | 260—284.3 |
| 3,081,309 | 3/1963 | Prost | 260—284.3 |

ALBERT T. MEYERS, Primary Examiner

S. J. FRIEDMAN, Assistant Examiner